Oct. 27, 1953 M. TEIGMAN Re. 23,728

AUTOMATIC VARIABLE DRIVE

Original Filed Feb. 15, 1946

INVENTOR

MAX TEIGMAN

BY J. B. Felsin

ATTORNEY

Reissued Oct. 27, 1953

Re. 23,728

UNITED STATES PATENT OFFICE 23,728

AUTOMATIC VARIABLE DRIVE

Max Teigman, New York, N. Y.

Original No. 2,526,435, dated October 17, 1950, Serial No. 647,793, February 15, 1946. Application for reissue August 18, 1951, Serial No. 242,562

14 Claims. (Cl. 74—191)

Matter enclosed in heavy brackets [ ] appears in the original patent but forms no part of this reissue specification; matter printed in italics indicates the additions made by reissue.

This invention relates to automatic variable drive.

An object of this invention is to provide a drive or transmission mechanism which is so arranged that the output speed increases automatically with increase in input speed, but in greater proportion to the increase of the input speed.

A further object of this invention is to provide a transmission or drive which is so arranged as to make it difficult for the input drive to be overloaded.

Still another object of this invention is to provide a transmission or drive which is so arranged that under load the output speed quickly decreases, thereby preventing the driving power from being overloaded. If a vehicle provided with a transmission mechanism embodying the invention climbs a hill or quickly passes another car on the road, the motor is prevented from being overloaded because the output slows down before the input is loaded. Then if the load is still heavy, the input slows down causing the output to further slow down but with a far greater proportion. The output, in accordance with the present invention, is so arranged as to slow down to a greater degree than the slow down of the input so as to make it easier for the vehicle to climb a hill or to make it easy to pass another car on the road. Under no load for a given input speed its highest possible output is very quickly reached.

Still another object of this invention is to provide an improved transmission of the character described which may be employed in conjunction with electric motors, gasoline motors, or any other rotary engines and may be used in airplanes, buses, tractors, or for any rotary drive which involves a revolving input and a revolving output shaft. When used in conjunction with an electric motor my improved transmission will eliminate starting box because the electric current necessary to start is relatively low.

Yet another object of this invention is to provide an improved variable drive of the character described which shall be relatively inexpensive to manufacture, which shall have a variety of applications, and which shall be practical and efficient to a high degree in use.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top plan view of a variable drive embodying the invention;

Figure 1:
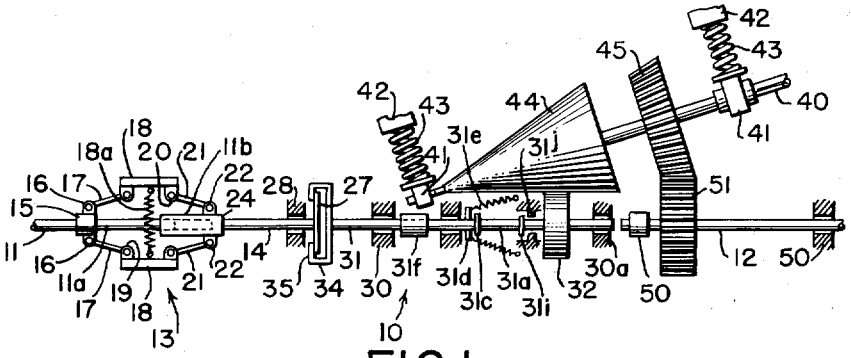
Figure 3:
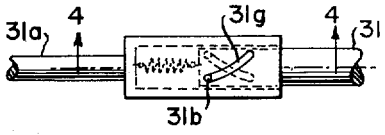
Fig. 3 is a top plan view of a detail.
Figure 4:
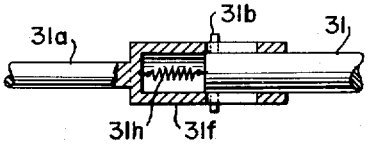
Fig. 4 is a cross-sectional view taken on line 4—4 of Fig. 3[.]; *and*

Referring now in detail to the drawing, 10 designates an automatic variable drive embodying the invention. The drive comprises a rotary, non-slidably mounted input shaft 11 which may be the output shaft of a vehicle motor or engine, and 12 designates an output shaft which may be connected by any suitable connection to a wheel of the vehicle.

Connected to the rotary shaft 11 is a governor 13. Said governor 13 is connected to a shaft 14 coaxial with shaft 11. On shaft 11 is a collar 15 provided with a plurality of apertured ears 16 connected by links 17 to governor weights 18. The governor weights 18 are provided with apertured ears 19 to which said links 17 are connected. Said weights are also provided with apertured ears 20 connected by links 21 to ears 22 on a collar 24 fixed to the shaft 14. The collar 24 is at one end of shaft 14. At the other end of shaft 14 is an annular friction disc 27. The shaft 14 is slidably as well as rotatably supported in bearing 28.

Shaft 11 may be provided with an extension 11a received in socket 11b in shaft 14. The weights 18 are interconnected by tension spring 18a. Slidably and rotatably supported in bearing 30 is a shaft 31 coaxial with shaft 14. On shaft 31 are a pair of oppositely extending pins 31b. Rotatably and slidably supported in bearing 30a is a shaft 31a coaxial with shaft 31. On shaft 31a is a collar 31c. Surrounding shaft 31a is a sleeve 31d biased to the right looking at Fig. 1, by means of suitably anchored tension springs 31e. Shaft 31a is formed with a socket 31f rotatably and slidably receiving the adjacent end of shaft 31. The socket 31f is formed with a pair of opposite cammed slots 31g through which the pins 31b project. Shaft 31 is interconnected to shaft 31a by coil tension spring 31h disposed within the socket. On shaft 31a is a second collar 31i adapted to contact a suitable annular stop 31j surrounding shaft 31a. It will now be understood that the sleeve 31d may engage the collar 31c and will move shaft 31a to the right until collar 31i contacts the stop 31j.

Fixed on shaft 31a for rotation therewith is a friction wheel 32. At one end of shaft 31 is a circular cage 34, surrounding disc 27 and having an inturned annular lip or flange 35 engaging the inner side of said disc.

It will now be understood that when the output shaft 11 speeds up, the weights 18 will fly out and draw shaft 14 to the left. Disc 27 will contact the flange or lip 35 of cage 34 and hence draw shaft 31 to the left. The disc 27 is a friction disc and frictionally engages the annular flange or lip 35 so that shaft 31 will rotate together with shaft 14. As shaft 31 is drawn to the left, the friction wheel 32 will likewise be drawn to the left for the purpose hereinafter appearing.

For the purpose hereinafter appearing, there is rotatably mounted on an axis inclined to the axis of shaft 31, a shaft 40. Shaft 40 is rotatably supported on a pair of spaced bearings 41. Interposed between the bearings 41 and fixed abutments 42 are coil compression springs 43 which serve to press shaft 40 towards shaft 31. The shaft 40 is non-slidably mounted on the bearings 41. On shaft 40 is a friction cone [43] *44* adapted to contact the friction wheel 32. In fact the springs 43 press the friction cone 44 against the friction wheel 32. On shaft 40, and between the bearings, is a bevel gear 45, for the purpose hereinafter appearing.

Rotatably and non-slidably mounted on suitable bearings 50 is the output shaft 12, which is coaxial with shaft 11. On said output shaft is a gear 51 meshing with the bevel gear 45. It will be noted that shaft 12 is coaxial with shafts 11, 14 and 31. When the shaft 11 is stationary, the friction wheel 32 is substantially at the high or right end of cone 44. It will be noted that the cone is tangent to a plane parallel to the axis of shaft 31 so that as the speed of shaft 11 increases and the governor weights fly out, shaft 31 will be pulled to the left, but the friction wheel 32 will remain in contact with the cone 44.

It will now be understood that the transmission is through shaft 11, governor 13, shaft 14, coupling 31f, shaft 31, shaft 31a, friction wheel 32, friction cone 44, gears 45 and 51 to output shaft 12. As shaft 11 begins to turn, the output shaft 12 will rotate at a low speed and the output speed will increase at an accelerated speed as the input speed increases. Little power is required to start rotation of the output shaft because it starts at very low speed. Under load the increase in speed is more gradual because coupling 31f under such conditions decreases speed of output shaft 12 in addition to the fact that when the input drive is loaded the governor would still further decrease output speed at a (slowing up) rate of speed. In case of a hill when the motor connected to shaft 11 is overloaded and slows down, shaft 12 will slow down still further to permit the vehicle to more easily climb the hill and thereby using the full power of the motor. When travelling on level roads, the speed increases with acceleration quickly, still using substantially full load.

When riding a level road, the car is geared almost to its highest capacity for a particular input speed. When coasting, it is geared to its fullest capacity for that speed. When accelerating or going up-hill the car goes into lower gear (as explained before) which makes the car accelerate without overloading the motor. The gear range quickly goes back to its high for that speed, automatically, when no load is encountered. The clutch 27, 35 could be adjusted to disengage only when idling at very low speed. If the governor spring 18a is stronger than the pull springs 31e, shaft 14 will move more quickly than shaft 31 causing the free wheeling when the drive (accelerator pedal) is released. If the pull springs 31e are stronger than the governor springs, shaft 31 will move back faster than shaft 14, thereby keeping the friction clutch 27, 35 engaged until the stop is reached. Then the clutch will disengage upon the drive slowing down. The stop 31j can be so adjusted or located that the clutch will disengage at idling speeds.

It will further be understood that when the shaft 31 is rotating at low or normal speeds, the pins 31b will remain as shown in the drawing. However, should the drive encounter a big load, the pins 31b will slide in the cam slots 31g thereby moving shaft 31a to the right, looking at Fig. 1, and putting the gearing into a lower register. When such action occurs, the spring 31h is tensioned and tends to bring the shaft 31a back to normal longitudinal position when the load decreases. It will therefore be understood that normally, the shafts 31 and 31a rotate together but in case of load there is relative rotation between said shafts as well as relative sliding movement to change the gear register.

If desired the governor can be eliminated and a manual clutch substituted for clutch 27, 34, 35. In such event the length of slots 31g could be substantially the same length as cone 44, and the wheel 32 would be at the small end of the cone when not turning. The starting load would then move wheel 32 toward the large end of the cone to start the output shaft at lower speed. Before the output shaft starts to turn, the wheel 32 moves to a point where it can start rotating the cone and hence the output shaft.

If desired the governor can be adjusted for just enough movement to actuate the clutch 27, 34, 35, and in such case the coupling 31f would be of the length of the cone and operate as described above.

Figure 5:
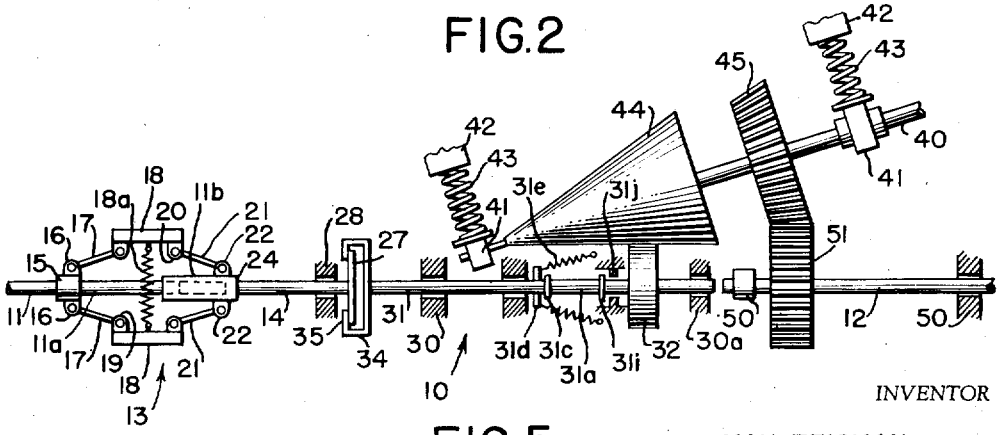
*Fig. 5 is a top plan view of a variable drive embodying the invention and illustrating another slightly modified construction.*

Furthermore if desired coupling 31f may be eliminated, *see Fig. 5*, so that the governor will move the wheel 32 the length of cone 44.

Flexible shafts or desirable gearing could be interposed in [slots] *shafts* 14 or 31 to arrange the output shaft at any desirable angle relative to the input shaft.

Figure 2:
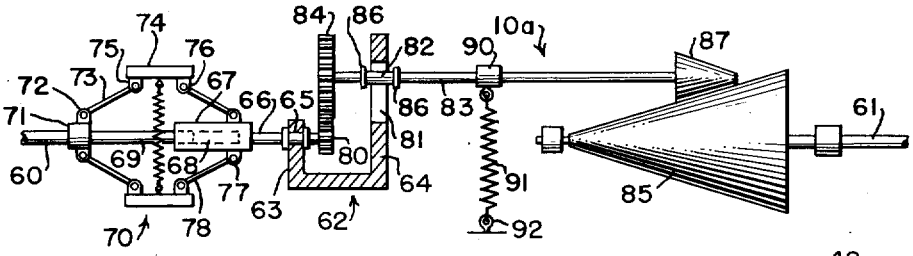
Fig. 2 is a top plan view of variable drive embodying the invention and illustrating a modified construction.

In Fig. 2 there is shown a transmission or variable drive 10a, embodying the invention, and illustrating a modified construction. In Fig. *2* [10a] 60 designates an input shaft which may be connected to the motor of a vehicle, and 61 indicates the output shaft which may be connected by suitable gearing to the wheels of the vehicle.

Slidably mounted in any suitable support (not shown) is a yoke 62 having parallel arms 63 and 64. Arm 63 is provided with a bearing 65. Rotatably mounted in the bearing 65 is a shaft 66. Shaft 66 is non-slidable relative to bearing 65. Shaft 66 is furthermore provided with an integral sleeve 67 formed with an opening or socket 68 coaxial with shaft 60. Fixed to shaft 60 is an extension 69 slidably engaged within the opening 68. Interconnecting shafts 60 and 66 is a speed governor 70. Said governor comprises a collar 71 fixed to shaft 60 and provided with apertured ears 72. Pivoted to the ears 72 are links 73. The governor further comprises a plurality of weights 74 each provided with a pair of ears 75 and 76. Links 73 connect the ears 72 with the ears 75. On sleeve 67 are ears 77 connected by links 78 to the ears 76. The shaft 60 is non-slidably mounted in any suitable bearings.

It will now be understood that as the shaft 60 increases in speed, the weights 74 will fly out, thereby causing shaft 66 to slide to the left as it rotates. Such movement of shaft 66 will pull the yoke 62 to the left therewith. On shaft 66 and disposed within the yoke is a gear 80. Arm 64 is parallel to arm 63 and is provided with a longitudinal slot 81. Slidably mounted within the slot is a bearing 82. Extending through the bearing 82 is a shaft 83. On shaft 83 is a gear 84 meshing with gear 80. The bearing 82 is provided with collars 86 engaging opposite sides of yoke arm 64. Shaft 83 is non-slidably connected to bearing 82. It will now be understood that as the yoke 62 is pulled to the left, it will also pull shaft 83 to the left as said shaft rotates. On shaft 83 is a small friction cone 87. On the output shaft 61 is a large cone 85, frictionally engaging the cone 87. It will be noted that the cones 87 and 85 point in opposite directions.

On shaft 83 is a sleeve 90 connected by coil compression spring 91 to a fixed anchor 92. Spring 91 tends to press the cone 87 against the cone 85. It will now be understood that as the speed of shaft 60 increases, shaft 66 will be pulled to the left, pulling yoke 62 to the left therewith. Such movement of the yoke 62 will carry shaft 83 to the left and move cone 87 down to the small end of the large cone 85 thereby increasing the speed of the output shaft progressively. Shaft 83 may tilt due to the sliding connection of bearing 82 in the slotted arm 64.

It will be understood that the cones 87, 85 may be replaced by friction discs at right angles to each other so that the shaft 61 will be at right angles to the shaft 83.

*In Fig. 5 there is shown a modified construction of the invention which is exactly the same as the device shown in Fig. 1, with the exception that the coupling 31f is eliminated, and shaft 31a is a continuation of shaft 31.*

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a non-slidable, rotary shaft, a rotary and slidable shaft, a governor connecting said shafts, a second rotary and slidable shaft, friction means to interconnect said rotary and slidable shafts, means to limit movement of said second rotary and slidable shaft in one direction, a friction wheel on the second rotary and slidable shaft, a rotary friction cone contacting said friction wheel, an output shaft, and gearing connecting said output shaft with said friction cone.

2. In combination, a non-slidable, rotary shaft, a rotary and slidable shaft, a governor connecting said shafts, a second rotary and slidable shaft, friction means to interconnect said rotary and slidable shafts, means to limit movement of said second rotary and slidable shaft in one direction, a friction wheel on the second rotary and slidable shaft, a rotary friction cone contacting said friction wheel, an output shaft, gearing connecting said output shaft with said friction cone, and spring means to press said friction cone against said friction wheel.

3. An input rotary shaft, a rotary and slidable shaft coaxial therewith, a governor interconnecting said shafts, a second rotary and slidable shaft, means to connect said rotary and slidable shafts for rotation and sliding movement, means to limit movement of said second rotary and slidable shaft in one direction, a friction drive member on the second rotary and slidable shaft, and a friction cone in contact with said friction and drive member.

4. An input rotary shaft, a rotary and slidable shaft coaxial therewith, a governor interconnecting said shafts, a second rotary and slidable shaft, means to connect said rotary and slidable shafts for rotation and sliding movement, means to limit movement of said second rotary and slidable shaft in one direction, a friction drive member on the second rotary and slidable shaft, a friction cone in contact with said friction and drive member, and spring means to maintain the friction drive member and friction cone in frictional contact.

5. A drive comprising an input rotary and non-slidable shaft, a rotary and slidable shaft, a speed governor interconnecting said first two shafts, a second slidable and rotary shaft, a friction clutch interconnecting said rotary and slidable shafts, a third rotary and slidable shaft, means connecting said second and third rotary and slidable shafts to permit relative rotation and sliding movement therebetween, spring means interconnecting said second and third slidable and rotary shafts, a friction wheel on said third rotary and slidable shaft, and a friction cone engaging said friction wheel, and means to limit movement of said third rotary and slidable shaft in one direction.

6. A drive comprising an input rotary and non-slidable shaft, a rotary and slidable shaft, a speed governor interconnecting said first two shafts, a second slidable and rotary shaft, a friction clutch interconnecting said rotary and slidable shafts, a third rotary and slidable shaft, means connecting said second and third rotary and slidable shafts to permit relative rotation and sliding movement therebetween, a friction wheel on said third rotary and slidable shaft, a friction cone engaging said friction wheel, spring means interconnecting said second and third slidable and rotary shafts, and spring means tending to move said third slidable and rotary shaft in one direction and means to limit movement of said third rotary and slidable shaft in one direction.

7. In combination, a non-slidable, rotary shaft, a rotary and slidable shaft, a governor connecting said shafts, a second rotary and slidable shaft, clutch means to interconnect said rotary and slidable shafts, means to limit movement of said second rotary and slidable shaft in one direction, a friction wheel on the second slidable and rotary shaft, a rotary friction cone, contacting said friction wheel, an output shaft, and gearing connecting said output shaft with said friction cone.

8. In combination, a non-slidable, rotary shaft, a rotary and slidable shaft, a governor connecting said shafts, a second rotary and slidable shaft, clutch means to interconnect said rotary and slidable shafts, means to limit movement of said second rotary and slidable shaft in one direction, a friction wheel on the second slidable and rotary shaft, a rotary friction cone contacting said friction wheel, an output shaft, and gearing connecting said output shaft with said friction cone, and spring means to press said friction cone against said friction wheel.

9. A drive comprising an input rotary and non-slidable shaft, a rotary and slidable shaft, a speed governor interconnecting said first two shafts, a second slidable and rotary shaft, a clutch means interconnecting said rotary and slidable shafts, a third rotary and slidable shaft, means connecting said second and third rotary and slidable shafts to permit relative rotation and sliding movement therebetween, spring means connecting said second and third slidable and rotary shafts, a friction wheel on said third rotary and slidable shaft, a friction cone engaging said friction wheel and means to limit movement of said third rotary and slidable shaft in one direction.

*10. In combination, a rotary shaft, a slidable and rotary shaft, a torque sensitive coupling interconnecting said two shafts with the degree of sliding movement of the slidable and rotary shaft being dependent upon the torque imposed on the latter, an output shaft, and a variable speed transmission interconnecting the slidable and rotary shaft with said output shaft, with the speed of said output shaft being dependent upon the degree of sliding movement of said rotary and slidable shaft.*

*11. In combination, a rotary and non-slidable input shaft, a slidable and rotary shaft, means including a speed governor interconnecting said two shafts, with the degree of sliding movement of the slidable and rotary shaft being dependent upon the speed of the input shaft, fixed diameter means on said slidable and rotary shaft rotating therewith, an output shaft, and variable speed transmission interconnecting the fixed diameter means with the output shaft, with the speed of the output shaft dependent upon the degree of sliding movement of said slidable and rotary shaft.*

*12. In combination, a non-slidable and rotary input shaft, a slidable and rotary shaft, a speed governor interconnecting said shafts, with the degree of sliding movement of said slidable and rotary shaft being dependent upon the speed of the input shaft, a second slidable and rotary shaft, means including a torque sensitive coupling interconnecting said first and second slidable and rotary shafts, with the degree of sliding movement of said second slidable and rotary shaft relative to the first slidable and rotary shaft being dependent upon the torque imposed on said second slidable and rotary shaft, an output shaft, and a variable speed transmission interconnecting said second slidable and rotary shaft with said output shaft, with the speed of the output shaft being dependent upon the degree of sliding movement of the second slidable and rotary shaft.*

*13. In combination, a non-slidable and rotary input shaft, a slidable and rotary shaft, a speed governor interconnecting said two shafts, with the degree of sliding movement of said slidable and rotary shaft being dependent upon the speed of the input shaft, a second slidable and rotary shaft, a clutch interconnecting said first and second slidable and rotary shafts for rotary and sliding movement together therewith, a third slidable and rotary shaft, a torque sensitive coupling interconnecting said second and third slidable and rotary shafts, with the degree of sliding movement of the third slidable and rotary shaft relative to the second slidable and rotary shaft being dependent upon the degree of torque imposed upon said third slidable and rotary shaft, an output shaft, and a variable speed transmission interconnecting said output shaft with the third slidable and rotary shaft, with the speed of the output shaft being dependent upon the degree of sliding movement of said third slidable and rotary shaft.*

*14. In combination, a rotary shaft, a slidable and rotary shaft, a torque sensitive coupling interconnecting said two shafts with the degree of sliding movement of the slidable and rotary shaft being dependent upon the torque imposed on the latter, an output shaft, and a variable speed transmission interconnecting the slidable and rotary shaft with said output shaft, with the speed of said output shaft being dependent upon the degree of sliding movement of said rotary and slidable shaft, said coupled shafts being coaxial and said coupling comprising spring tension means urging movement of said shafts toward each other, and means to permit relative rotation between said coupled shafts.*

MAX TEIGMAN.

References Cited in the file of this patent or the original patent

UNITED STATES PATENTS

| Number | Name | Date |
|---|---|---|
| 821,631 | Felt | May 29, 1906 |
| 863,434 | Pattison et al. | Aug. 13, 1907 |
| 1,137,507 | McKeever | Apr. 27, 1915 |
| 1,246,683 | Tooth | Nov. 13, 1917 |
| 1,428,326 | Fay | Sept. 5, 1922 |
| 1,587,645 | Hicguet | June 8, 1926 |
| 1,650,594 | Bing | Nov. 29, 1927 |
| 1,772,593 | Robertson | Aug. 12, 1930 |
| 1,781,761 | Mayer | Nov. 18, 1930 |
| 1,837,978 | McGavern et al. | Dec. 22, 1931 |
| 2,243,321 | Smith | May 27, 1941 |

FOREIGN PATENTS

| Number | Country | Date |
|---|---|---|
| 321,231 | Great Britain | Nov. 7, 1929 |
| 436,705 | Germany | Nov. 6, 1926 |
| 600,149 | France | Nov. 3, 1925 |
| 798,244 | France | Mar. 2, 1936 |